(12) United States Patent
Tamanini (10) Patent No.: US 8,136,463 B2
(45) Date of Patent: Mar. 20, 2012

(54) DEVICE AND METHOD FOR CONTINUOUS PRODUCTION OF A THREE DIMENSIONAL FABRIC FOR MAKING PANELS

(75) Inventor: Achille Pio Tamanini, Milan (IT)

(73) Assignee: Nat Style Limited, London (GB)

(*) Notice: Subject to any disclaimer, the term of this patent is extended or adjusted under 35 U.S.C. 154(b) by 337 days.

(21) Appl. No.: 12/454,749

(22) Filed: May 22, 2009

(65) Prior Publication Data
US 2009/0291221 A1 Nov. 26, 2009

(30) Foreign Application Priority Data
May 26, 2008 (IT) .............................. MI2008A0971

(51) Int. Cl.
*D05B 23/00* (2006.01)
(52) U.S. Cl. .................... 112/475.01; 112/260; 112/440
(58) Field of Classification Search ............. 112/475.01, 112/475.07, 475.08, 475.17, 1, 258, 260, 112/412, 217.1, 148; 28/107, 115
See application file for complete search history.

(56) References Cited

U.S. PATENT DOCUMENTS

| 4,080,915 | A | 3/1978 | Bompard |
| 4,622,254 | A | 11/1986 | Nishimura |
| 5,018,255 | A * | 5/1991 | Bolliand ......................... 28/107 |
| 5,759,321 | A | 6/1998 | Cahuzac |
| 5,894,643 | A * | 4/1999 | Fehrer ............................ 28/115 |
| 7,503,149 | B2 * | 3/2009 | Salmon et al. .................. 52/661 |
| 7,846,528 | B2 * | 12/2010 | Johnson et al. ............... 428/119 |
| 2007/0090162 | A1 * | 4/2007 | Verhaeghe .................... 228/101 |

FOREIGN PATENT DOCUMENTS

| EP | 0 449 033 | 10/1991 |
| EP | 1 596 024 A | 11/2005 |
| FR | 2 718 670 A | 10/1995 |
| WO | WO92/21511 | 12/1992 |
| WO | WO99/19137 A | 4/1999 |

OTHER PUBLICATIONS

EP Search Report Dated Sep. 10, 2009.

* cited by examiner

*Primary Examiner* — Dannny Worrell
(74) *Attorney, Agent, or Firm* — Hedman & Costigan, P.C.; James V. Costigan

(57) ABSTRACT

Method and device for continuous production of three dimensional fabrics (50) made up of two or more external layers (51,52) of fabric connected to each other using thread strands (53) starting from separate pieces of fabric, overlapping and joining them and proceeding to sewing using strands (53), said sewing using strands (53) being performed using two pieces of fabric lying and sliding on the opposite faces of a spacer comb-like structure (6), that determines the length of the thread strands (53).

17 Claims, 6 Drawing Sheets

DEVICE AND METHOD FOR CONTINUOUS PRODUCTION OF A THREE DIMENSIONAL FABRIC FOR MAKING PANELS

The present invention refers to a device and method for continuous production of a three dimensional fabric to be used for making panels, commonly used in the shipbuilding, aeronautic and transport industries in general, as well as in civil and industrial building. It is known that the characteristics required for such panels include not only their structural rigidity and stability, but also thermal and acoustic insulation. Such panels are more and more advanced not only in terms of structural and insulation performances, but also in terms of lightness, easy installation, duration and so on and so forth.

However, the most demanding requirements regard the safety of people both during the installation of the panel and in case of accidents, for example in case of fire. Such requirements have led to the exclusion of construction materials and panel structures that were still satisfactory strictly in terms of performance.

A known technique for making panels, for example according to patent EP 0.449.033, provides for the use of a panel based on a three-dimensional fabric, impregnated with a thermoplastic or thermosetting resin. Such base panel consists in two external layers of fabric connected mutually with a sort of sewing using thread strands perpendicular to said two external layers. Any type of fiber and yarn can be used but, for safety purposes, those based on non-flammable or fireproof or those that cannot develop toxic or aggressive substances at high temperatures are preferred. Such materials can be inorganic, for example based on fibreglass, or organic, for example carbon fiber, but in such case it is necessary to provide for the coating of the fabric to make it fireproof as outlined hereinafter. The external layers can be made up of traditional weft and warp fabric, knitted fabric or even a non-woven fabric.

Such three dimensional fabric panel is processed impregnating the fibrous structure with a resin or bonding agent, for example through the technique illustrated in patent EP 0.591.324. Such technique provides for that the two external layers of the panel be maintained parallel and well detached from each other, maintaining the connection thread strands well stretched and causing, in such condition, the setting and hardening of the resin, and thus obtaining a rigid and quite light panel having a void volume therein corresponding to the free length of the extended sewing stitches or strands joining the two layers. Generally provided for, still in the abovementioned patents, are thermoplastic or thermosetting resins; for safety purposes, even for such resins or bonding agent, non-flammable or fireproof bonding agents or agents that do not generate toxic or aggressive substances at high temperatures are still preferred. The fireproof coating of the fabric is obtained by impregnating the same using bonding agents of such type.

Thus, the determinant component of such type of panel consists in the base three dimensional fabric piece cut to size, with double layer and connection with perpendicular strands or threads, to be extended during the step of setting and hardening of the resin or of the bonding agent which solidifies the structure. Generally, in the prior art, such base fabric structure is produced through the technique of the bound double fabric, more known in the double weaving production of velvet.

The application of such technique to the production of three dimensional fabrics intended for use in the impregnated panels is poorly productive, complex and costly, and it is not environmental-friendly due to the strong development of dusts and fiber waste material.

The technical problem tackled through the present invention thus consists in improving the characteristics of the base three dimensional fabric and in the simplification of its production method, for the specific use of impregnated panels thereof.

An object of the present invention is that of providing a method and a device for the continuous production of three dimensional fabrics made up of two or more external layers of fabric parallel and connected to each other using thread strands perpendicular to said external layers, capable of overcoming the drawbacks of the devices and of the methods of the prior art.

The method for producing three dimensional fabrics according to the present invention is defined, in its essential components, in the first claim while its variants and preferred embodiments are specified and outlined in the dependent claims 2-8.

The device for producing three dimensional fabrics according to the present invention is defined, in its essential components, in the $12^{th}$ claim while its variants and preferred embodiments are specified and outlined in the dependent claims 9-17.

For better illustration of the characteristics and advantages of the present invention, the invention is described with reference to a typical embodiment thereof illustrated in FIGS. 1-8 for exemplifying and non-limiting purposes, wherein.

Referring to FIGS. 1-4, a first embodiment of the device for producing a three dimensional fabric for panels according to the present invention is shown, indicated in its entirety with 100.

Figure 1:
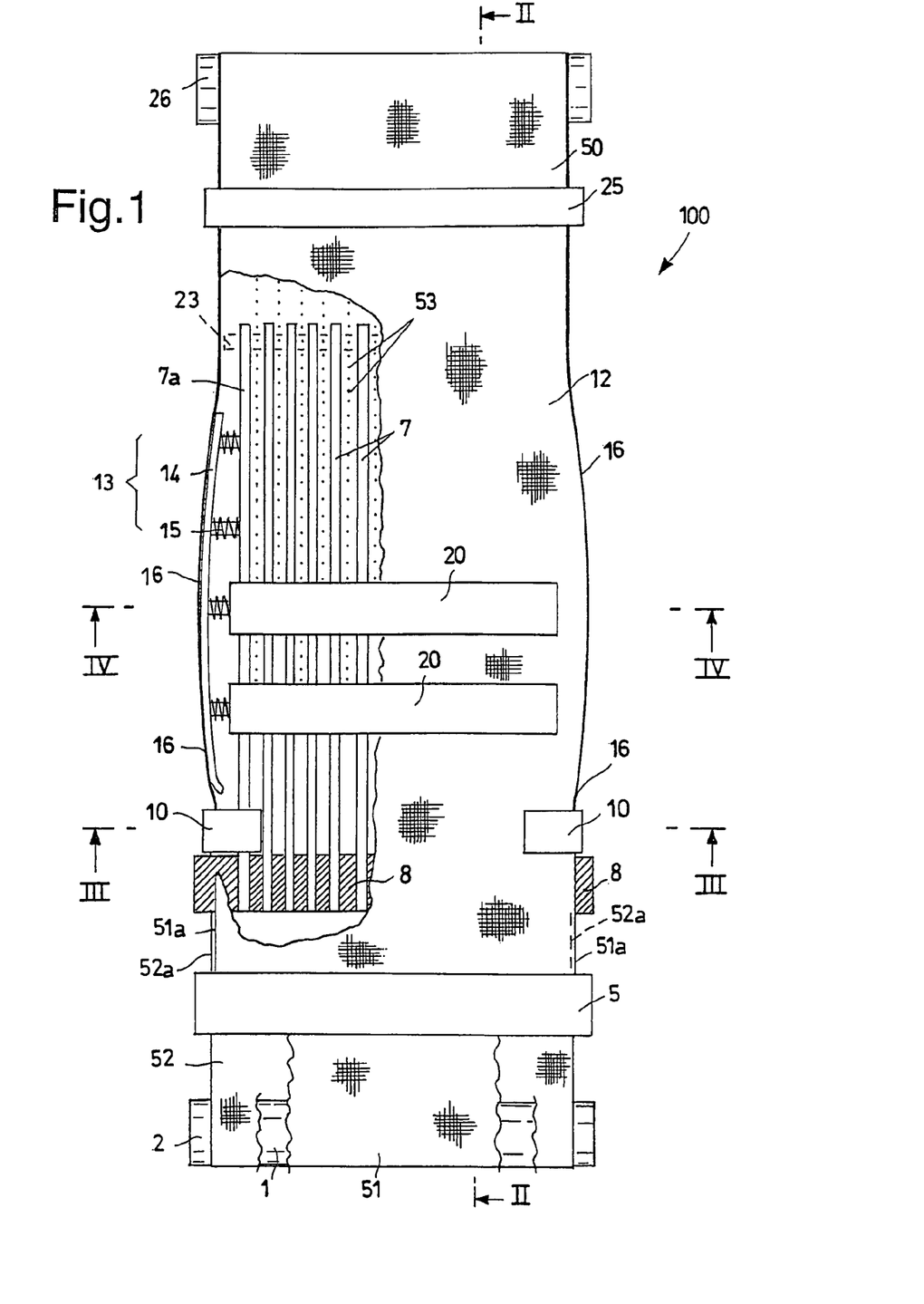
FIG. 1 is a schematic plan and partially broken view of a first embodiment of the device for producing a three dimensional fabric for panels from which the steps of the method for producing the three dimensional fabric according to the present invention are derived.

Referring to FIG. 1, the three dimensional fabric 50 is obtained starting from two bobbins 1 and 2 of pieces of fabric 51,52 that shall form the two external layers of the three dimensional fabric 50.

Such bobbins 1,2 are mounted on two rotating shafts and are unwound under the pulling force exerted downstream by a gathering roller 26 that determines the linear operation speed.

The pieces of fabric 51,52 coming from the two bobbins 1,2 may be, for example, of a non-flammable inorganic fabric based on glass fiber. The pieces of fabric preferably have a width coherent with that of the panel to be produced subsequently using the three dimensional fabric 50 being processed.

The two pieces of fabric 51,52 are overlapped and aligned with respect to each other in a tensioning device 5. Such tensioning device may, for example, consist in a diverter slot whose width is equivalent to that of the pieces of fabric 51,52 or it can be made up of one or more pairs of rollers pressed together and which exert a controlled braking action with respect to the pulling force coming from the final gathering roller.

At the exit of the tensioning device 5 the two pieces of fabric 51,52 diverge vertically ending up abutting in a sliding manner respectively on the opposite sides of a comb-like structure 6, for example on the upper and lower surface of a horizontal comb-like spacing structure 6. Such structure 6 is for example made with a plurality of bars 7 horizontal and integral to a common transverse base 8 constrained to the fixed structure (not illustrated) of the device 100.

The bars 7 are arranged in the longitudinal direction and are spaced from each other, generally, with a pitch corresponding to the space desired between the longitudinal lines of the connection strands 53 between the external layers 51,52 of the three dimensional fabric 50.

The height of the bars 7 instead corresponds to the length desired for such thread strands 53 and to the required thickness of the internal void space of the final panel to be produced using the three dimensional fabric 50. The bars can be positioned height-wise at will, except for the requirement that they be sufficiently rigid, but the rigidity is generally comprised between 10 and 50 mm. The length of the bars 7 corresponds to the space required for arranging the sewing members 10,20 that create the connection of the two pieces of fabric 51,52 to each other, by means of the thread strands 53 that bind the two external layers of the three dimensional fabric 50 to each other, maintaining the two pieces of fabric 51,52 lying and sliding on the spacer comb-like structure. Generally, the length of the comb 6 is in the order of one meter. The width of the spacer comb-like structure 6 corresponds to the height of the three dimensional fabric 50 which in turn depends on the transverse dimension of the final insulating panel. For example, in order to obtain a 600 mm high three dimensional fabric 50, the comb is made using thirty one bars 7, arranged with a 20 mm transverse pitch. Thus, the lines of the sewing strands 53 are thirty in such case.

Figure 2:
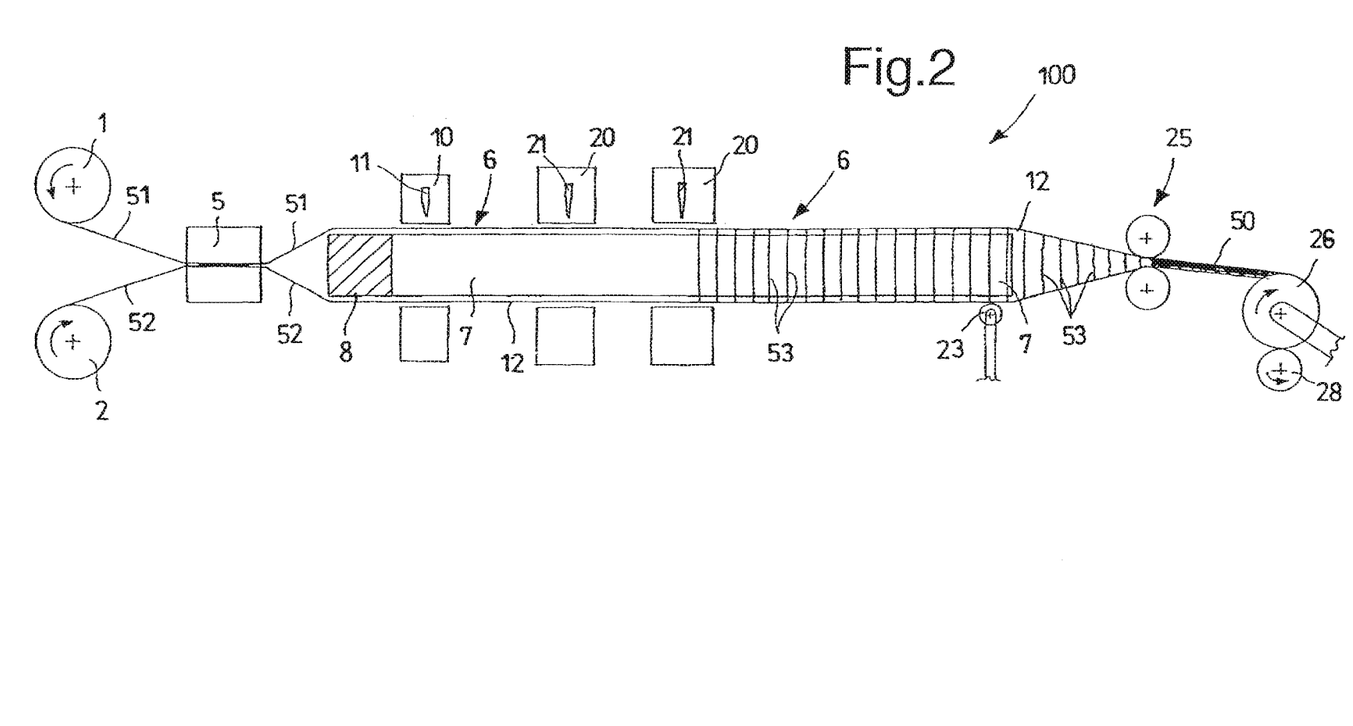
FIG. 2 is a lateral section along line II-II of FIG. 1 of the device for producing a three dimensional fabric for the panels of FIG. 1.
Figure 3:
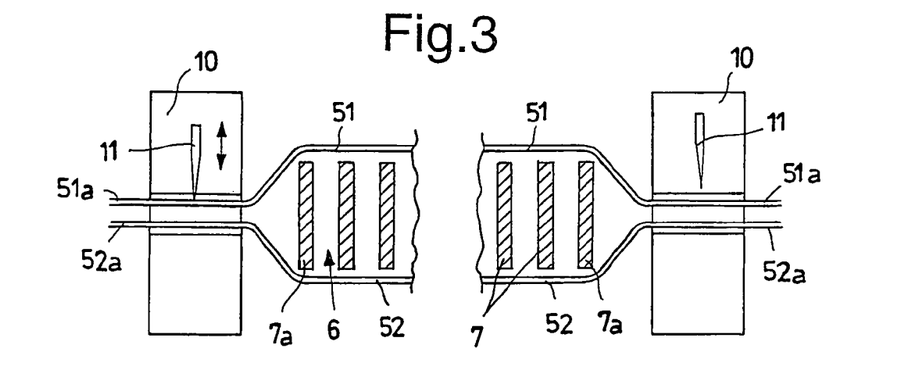
FIG. 3 shows a transverse section of the device according to the invention along line III-III of FIG. 1 arranged at the sewing heads for joining the two pieces of fabric of the external layers to form a fabric tubular element.
Figure 4:
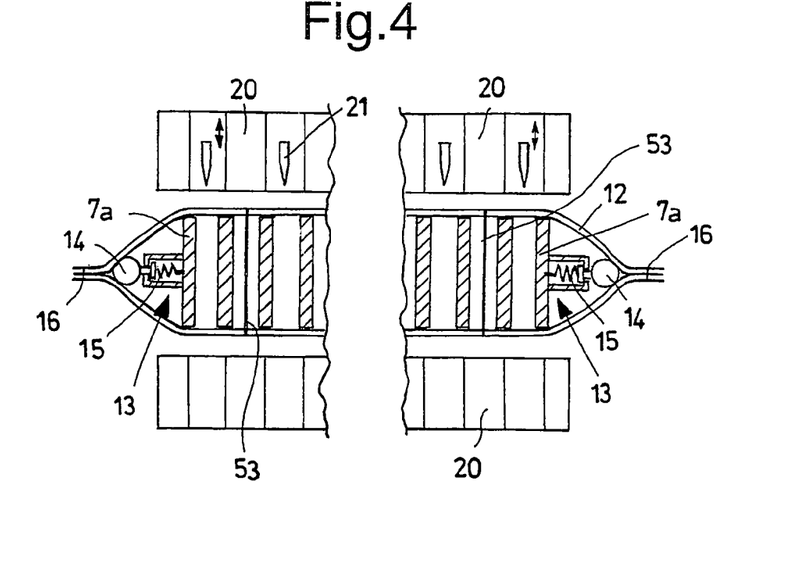
FIG. 4 shows the transverse section of the device according to the invention along line IV-IV of FIG. 1 arranged at the transverse tensioning device and the sewing heads of the strands for connecting external layers to form the three dimensional fabric.
Figure 4A:
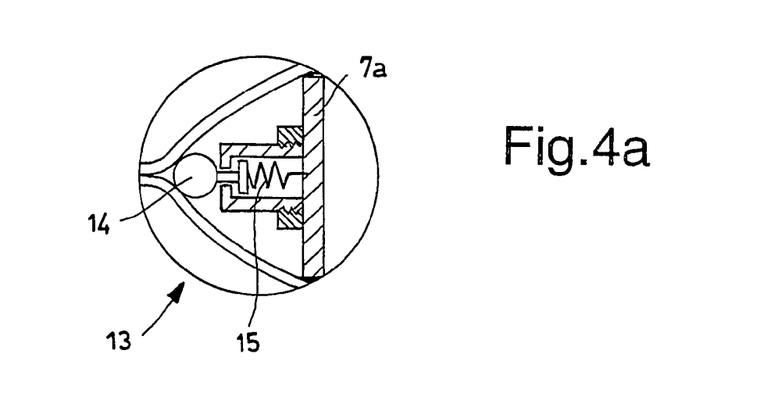
FIG. 4a is an enlarged detail of FIG. 4.

The first stage for connecting the pieces of fabric 51,52 consists in joining their lateral edges 51*a*,52*a*. As a matter of fact, the method for sewing the two pieces of fabric using the strands 53 is performed with their edges overlapped and joined. According to a preferred embodiment of the invention such joining is performed by sewing 16 their edges 51*a*,52*a* to form a tubular element therewith. As schematically shown in the section of FIG. 2, the lateral edges of the two pieces of fabric 51,52 are joined and introduced into two first sewing units 10 that join the two edges by means of a sewing 16 using a thread, for example using chain stitches, made using needles 11 in alternating vertical motion by means of traditional sewing heads. Alternatively, the overlapping and joining of the two edges 51*a*,52*a* can be done by coupling them temporarily before sewing and then releasing them, after they have been connected using the thread strands. Such temporary coupling of the edges can be attained, for example, using mobile grippers borne on the chain in a closed circuit, which moves at the drawing speed of the pieces of fabric, the grippers being engaged and disengaged at predetermined positions. Such grippers may be mechanical, pneumatic spike-shaped and so on and so forth. Such temporary coupling of the edges may also be obtained using pairs of rotating temples, which also impart a transverse tension of the two pieces of fabric 51,52.

At the exit of the stage of sewing using the first sewing units 10, the pieces of fabric 51,52 were joined to form a tubular fabric element 12 which slides on the spacer comb-like structure 6 by still being pulled by the final gathering roller 26. Before reaching the subsequent sewing stage, the tubular element 12 reaches a transverse tensioning device 13.

In the illustrated embodiments, such tensioning device 13 is obtained through two longitudinal bars 14, mounted on two more external bars 7*a* of the comb-like structure 6 and pushed outwards: such thrust can be exerted by means of a springs system 15, or through pneumatic or hydraulic means.

Due to the transverse tensioning exerted using the tensioning device 13, the tubular element 12 is forced to slide adhering along the upper and lower portions of the bars 7 of the spacer comb-like structure 6.

The tubular element 12 reaches in such condition at the sewing stage wherein the three dimensional fabric is made "quilting" it using the thread strands 53; therein, one or more rows of second sewing units 20 connect the two faces of the tubular element 12 using long stitches or thread strands 53 with a series of sewings using a thread, such sewings being obtained by means of needles 21 in alternating motion in the vertical plane in the spaces between the bars 7.

The alternating motion in the vertical plane may occur both perpendicularly with respect to the sliding direction of the pieces of fabric 51,52 or with a given inclination with respect to the same.

The second sewing units 20 have only one needle stem 21, with the length of the stem corresponding to the length desired for the strands 53.

At the exit of the stage for sewing the edges through the first sewing units 10 and the stage of forming the strands 53 through the second sewing units 20, the tubular fabric element 12 was processed to obtain a three dimensional fabric 50: it slides on the spacer comb-like structure 6 still pulled by the final gathering roller 26, with the sewing rows having strands 53 that slide along the longitudinal spaces between the bars 7 of the comb-like structure 6.

Such strands 53 have a length that is constant and coherent with the height of the bars 7, and they are arranged according to longitudinal lines. The number of connection strands depends on the excursion frequency of the needles 21 of the second sewing units 20 and the translation speed exerted by the pulling force of the final gathering; it is therefore regulated operating on such parameters. Generally, the number of thread strands 53 required for producing insulating panels is comprised between 2000 and 20000 strands per square meter.

As already mentioned above, regarding the production of a dimensional fabric using the strands 53, instead of operating on the pieces of fabric 51,52 joined in a tubular element 12 by means of sewing their edges 51*a*,52*a*, one can operate on the pieces of fabric 51,52 arranging such edges on each other before sewing in the second sewing units 20 using mobile grippers or using pairs of rotating temples. When sewing using the strands 53, such members accompany the advancement of the three dimensional fabric 50 maintaining it lying and adhering to the comb 6, imparting a given transverse tension to the edges 51*a*,52*a* with which they engage.

The yarn used for sewing the edges to obtain the tubular element 12 and for the strands 53 can be made of the same material as the fabric that forms the external layers 51,52 or be made of a different material, considering the different stresses to which the fabric and thread are subjected during the processing. Such freedom exists even for the count of the yarns used for the pieces of fabric that form the external layers 51,52, for sewing the edges 51a,52a and for the strands 53, that can be different and selected according to requirements.

Found at the free end of the spacer comb-like structure 6 is an idle support roller 23 supporting the structure 6 itself.

In the first embodiment, at the exit from the comb-like structure 6 the tubular element 12 is diverted by means of a pair of rollers 25 towards the gathering of the three dimensional fabric 50 in form of a continuous belt in a gathering bobbin 26, rotated at a constant linear speed, for example with support on an actuation roller 28 at a constant rotation speed.

In a second embodiment of the device 100 for producing a three dimensional fabric for panels, provided for is a system for applying a thermosetting resin preferably represented by means 60 for moving a fluid, such as for example a pump, connected to a plurality of pipes 61 arranged inside the bars 7 of the comb-like structure 6.

Figure 5:
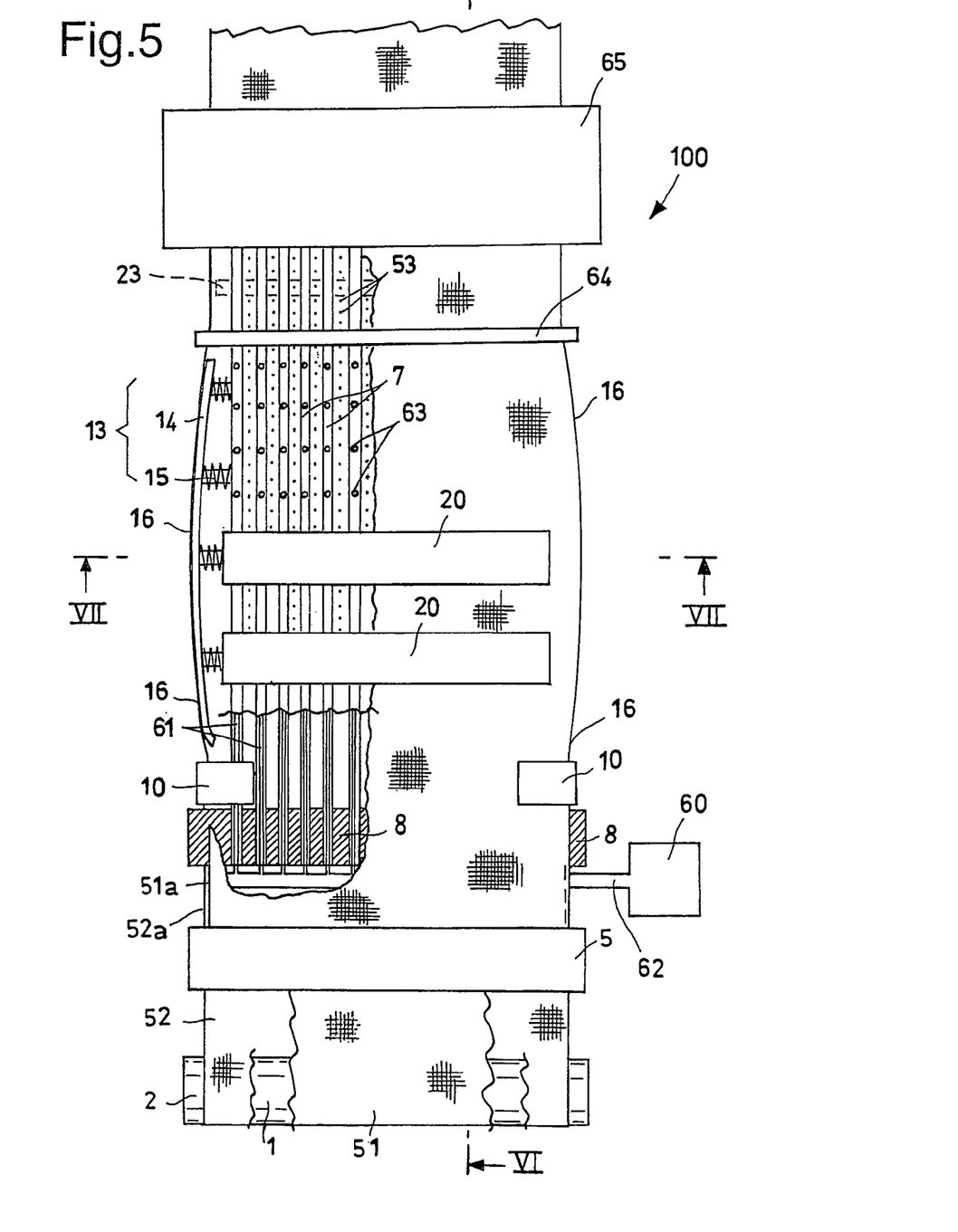
FIG. 5 is a schematic plan and partially broken view of a second embodiment of the device for producing a three dimensional fabric for panels according to the present invention.

In FIG. 5 the bars 7 are shown partially broken with the aim of revealing the pipes 61 arranged therein.

In particular, the connection of the means 60 for moving a fluid to the single pipes 61 is obtained through a single connection pipe 62.

Preferably provided for in each bar 7 is at least one pipe 61 and advantageously provided for are at least four pipes 61.

Figure 7:
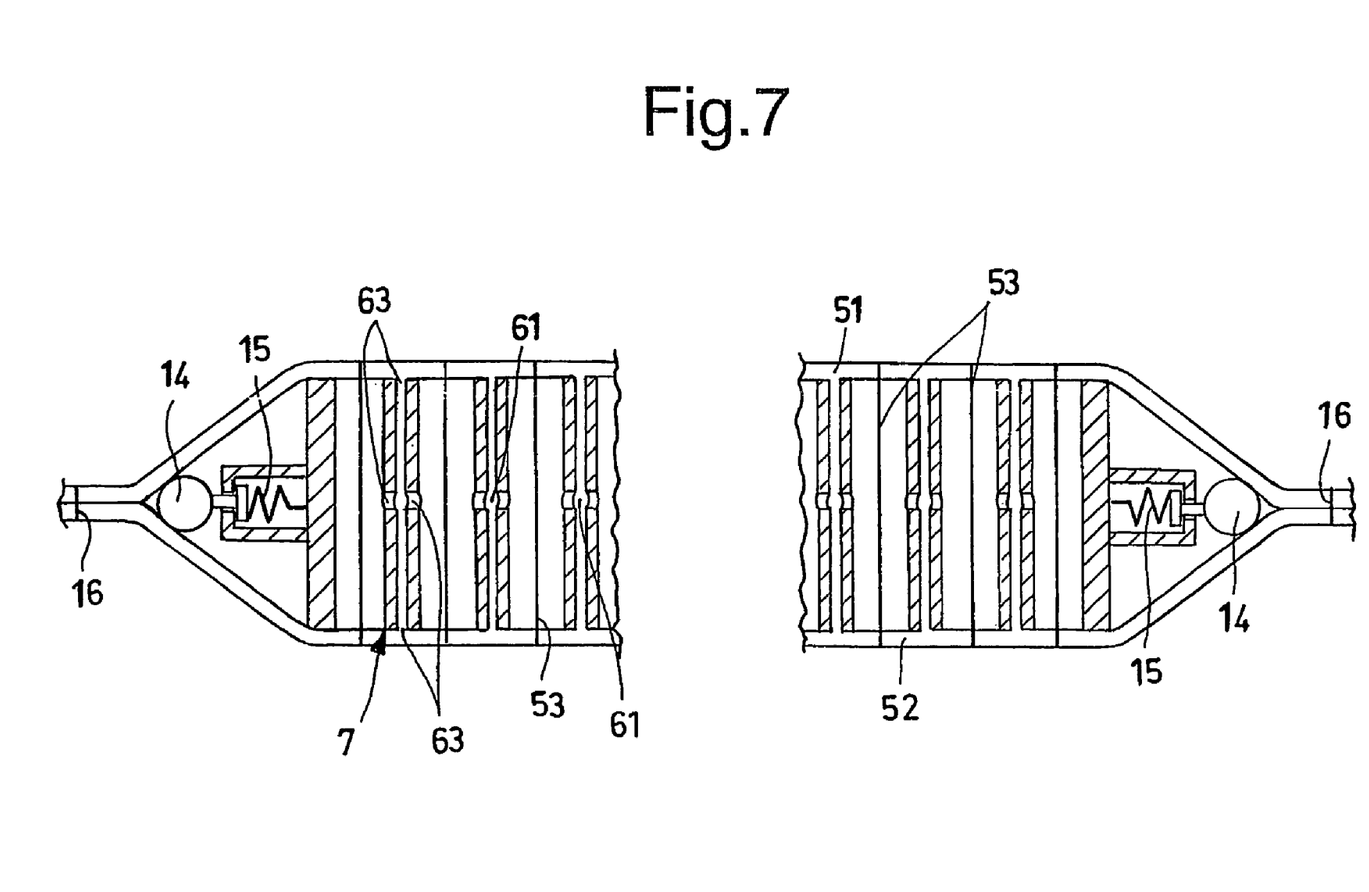
FIG. 7 shows a transverse section of the device according to the invention along line VII-VII of FIG. 5 arranged at the nozzles for supplying thermosetting resin.
Figure 8:
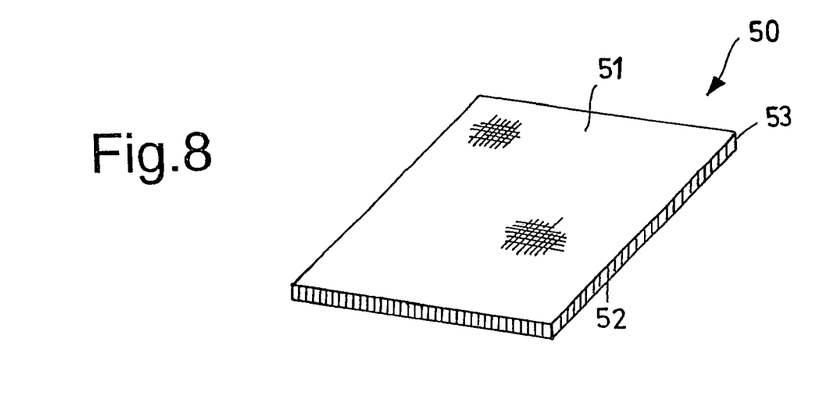
FIG. 8 is an axonometric schematic representation of the three dimensional fabric obtainable using the device and the method according to the present invention.

At the portion downstream of the second sewing units 20 thereof, the bars 7 of the comb-like structure 6 comprise a plurality of nozzles 63 connected to the internal pipes 61, exiting through which is the thermosetting resin pushed forward by the means 60 for moving a fluid.

The nozzles 63 are preferably distributed along the four surfaces of the bar 7, hence at the upper part, at the lower part and on the two vertical sides.

In such manner, exiting from the bars 7, the resin impregnates both the upper and lower pieces of fabric 51,52, and the strands 53 of the three dimensional fabric 50 formed downstream of the two sewing stages.

Figure 6:
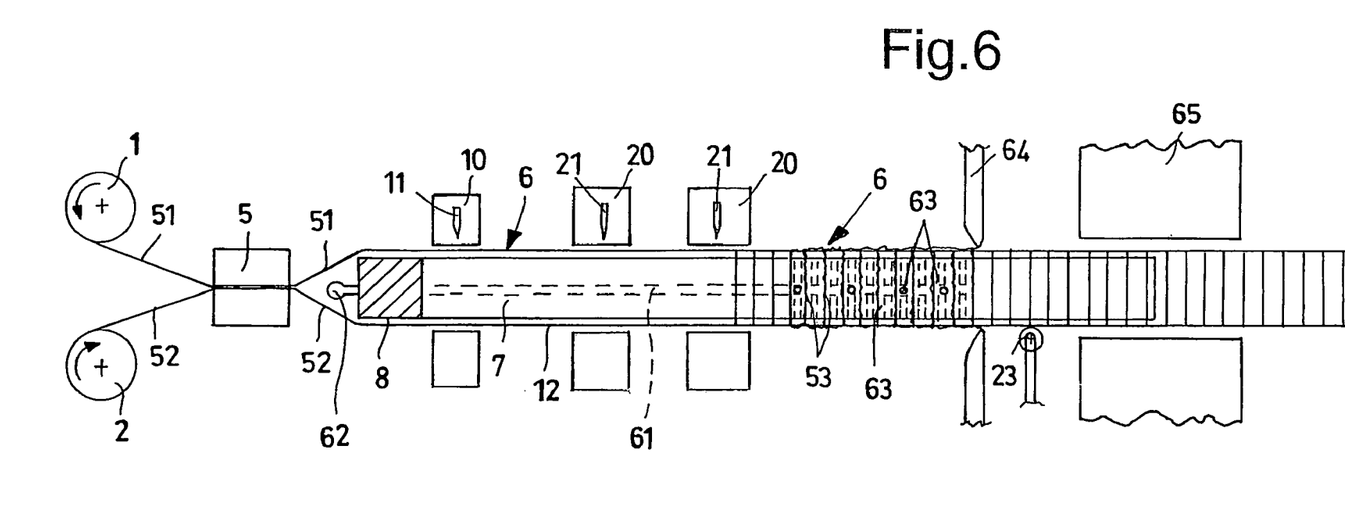
FIG. 6 is a lateral section along line VI-VI of FIG. 5 of the device for producing a three dimensional fabric for panels of FIG. 5.

In order to obtain a uniform and smooth layer of resin on both pieces of fabric, upper and lower 51,52, preferably provided for is a pair of levelling elements 64 arranged perpendicularly with respect to the advancement direction of the fabric 50 and substantially respectively at contact with the upper piece of fabric 51 and with the lower piece of fabric 52.

Such levelling elements 64 are preferably made of rubber.

Lastly, provided downstream of the pair of blades 64 is a device 65 for hardening the resin 65, partially extended in which is the comb-like structure 6. In such manner, the pieces of fabric, upper and lower 51,52, of the three dimensional fabric 50 impregnated with resin are maintained well detached with the strands 53 substantially extended, during at least a first step for setting and hardening the resin inside the hardening device 65.

Preferably, the hardening device 65 is an open microwave.

Thus, directly obtained exiting from the oven 65 is a rigid panel advanced through a special advancement and cutting plane (not illustrated).

In such second embodiment of the device 100 for producing a three dimensional fabric for panels, the pair of rollers 25 for diverting the three dimensional fabric 50 to form a final gathering bobbin 26 is thus replaced by a device 65 for hardening the resin to form the panel directly. The characteristics of the device and the method for producing a three dimensional fabric subject of the present invention as well as the respective advantages are clear from the outlined description.

The three dimensional fabric is produced having the dimensional characteristics required for use in panels, both regarding the height and the thickness of the three dimensional fabric, as well as the density of strands per surface unit of the three dimensional fabric. A yarn of the most convenient composition and count may be used for each of the components of the three dimensional fabric.

The method for producing the fabric by "quilting" using strands starting from two preformed pieces of fabric is much more productive, economical and more environmental friendly.

The strands for connecting the two external pieces of fabric have the same predetermined length and they generate a final panel having better dimensional and structural characteristics.

Lastly, it is clear that the device and the method thus conceived are susceptible to various modifications and variants, all falling within the scope of the invention; furthermore, all their particular components may be replaced with technically equivalent elements. For example, the implementation of the device may occur with the vertical, or sub-vertical arrangement of the comb-like structure, instead of the horizontal arrangement described up to now. Analogously, the sewing heads 10,20 may in such case operate with motion according to horizontal planes.

In practice, the material used, as well as the dimensions, may vary depending on the use requirements of the panel.

The invention claimed is:

1. Method for continuous production of three dimensional fabrics (50) having two external layers (51,52) of fabric having lateral edges where said two external layers of fabric (51,52) are arranged parallel and are connected to each other by means of connection strands (53) arranged perpendicular to said external layers of fabric (51,52), said method comprising:
   (a) providing: two bobbins (1,2), each having a layer of fabric (51,52) thereon that will form said two external layers (51,52) of the three dimensional fabric (50), said method further comprising:
   (b) connecting the two layers of fabric (51,52) by overlapping and joining their lateral edges (51a,52a); and
   (c) sewing said two layers of fabric (51,52) with a first sewing unit (10) using connection strands (53) to connect said layers of fabric (51,52), said sewing with connection strands (53) being performed with the two layers of fabric (51,52) lying and sliding respectively on two opposite faces of a spacer comb-like structure (6), which comprise a plurality of bars (7) arranged in the longitudinal direction and spaced from each other with a pitch corresponding to the space desired between successive longitudinal lines of connection strands (53), the height of said bars (7) corresponding to the desired length for the connection strands (53).

2. Method for continuous production of three dimensional fabrics (50) according to claim 1, wherein the step of joining the lateral edges (51a,52a) of the two layers of fabric (51,52) is performed by sewing (16) said lateral edges (51a,52a) together to form a tubular element (12).

3. Method for continuous production of three dimensional fabrics (50) according to claim 1, wherein the step of sewing the lateral edges (51a,52a) of the two pieces of fabric (51,52) is performed by temporarily coupling them and then releasing them, after the two layers of fabric (51,52) are sewn with connection strands (53).

4. Method for continuous production of three dimensional fabrics (50) according to claim 1, wherein before reaching the step of sewing using connection strands (53) the two layers of fabric (51,52) are maintained in transverse tension.

5. Method for continuous production of three dimensional fabrics (50) according to claim 2, wherein said tubular element (12), before reaching the stage of sewing using connection strands (53), passes in a transverse tensioning device (13) which forces it to slide on the opposite faces of the bars (7) of the spacer comb-like structure (6).

6. Method for continuous production of three dimensional fabrics (50) according to claim 1, wherein the sewing of said layers of fabric using connection strands (53) is performed using one or more rows of second sewing units (20) which connect the two layers of fabric (51,52) with long stitches or connection strands (53) with a series of sewings using a needles (21) in an alternating motion in the plane in the spaces between the bars (7).

7. Method for continuous production of three dimensional fabrics (50) according to claim 1, which further comprises the steps consisting of impregnating said layers of fabric (51,52) and said connection strands (53) using a thermosetting resin; and hardening said thermosetting resin while maintaining said layers of fabric (51,52) spaced apart and said connection strands (53) extended.

8. Method for continuous production of three dimensional fabrics (50) according to claim 1, wherein the number of connection strands (53) is regulated by the frequency of the motion of the needles (21) of the sewing units (20) and the speed of translation exerted by a pulling force exerted by a final gathering.

9. Device (100) for continuous production of three dimensional fabrics (50) made up of two external layers (51,52) of fabric parallel and connected to each other using connection thread strands (53) arranged perpendicular to said external layers, comprising connecting the layers of fabric (51,52) by overlapping and joining lateral edges (51a,52a) of said layers of fabric and one or more rows of second sewing units (20) for sewing said layers of fabric using connection strands (53) to connect said layers of fabric (51,52) while maintaining the lateral edges (51a,52a) of said layers of fabric (51,52) overlapped and joined, said one or more rows of second sewing units (20) for sewing using connection strands (53) are operated with the two layers of fabric lying and sliding respectively on two opposite faces of a spacer comb-like structure (6), which comprise a plurality of bars (7) arranged in a longitudinal direction and spaced with respect to each other using a pitch corresponding to the desired space between successive longitudinal lines of connection strands (53), the height of the bars (7) corresponding to a length desired for connection strands (53).

10. Device (100) for continuous production of three dimensional fabrics (50) according to claim 9, wherein the lateral edges (51a,52a) of said layers of fabric (51,52) are joined by two first sewing units (10) which join the two edges by means of sewing (16) by needles (11) operating in an alternating motion thereby generating a tubular element (12), or they consist in mobile grippers that engage said edges before the sewing and release them after they have been connected with the connection strands (53).

11. Device (100) for continuous production of three dimensional fabrics (50) according to claim 9, wherein said device has, upstream of the one or more rows of second sewing units (20) for sewing using connection strands (53) and a transverse tensioning device (13) for transverse tension to the layers of fabric (51,52).

12. Device (100) for continuous production of three dimensional fabrics (50) according to claim 10, wherein the transverse tensioning device (13) comprises two longitudinal bars (14), mounted on two outermost bars (7a) of the spacer comb-like structure (6) where said two longitudinal bars are pushed outwards, forcing the tubular element (12) formed with the layers of fabric (51,52) to slide along opposite faces of the bars (7) of the spacer comb-like structure (6).

13. Device (100) for continuous production of three dimensional fabrics (50) according to claim 12, wherein the longitudinal bars (14) are pushed outwards by a force exerted through a spring system (15) or through a pneumatic system or a hydraulic system.

14. Device (100) for continuous production of three dimensional fabrics (50) according to claim 9, wherein the one or more rows of second sewing units (20) for sewing using the connection strands (53) are arranged according to one or more transverse rows, for connecting the two layers of fabric (51,52) that are coupled using long stitches or connecting strands (53), by of sewing the layers of fabric using a thread and needles (21) operating in alternating motion in the plane in spaces between the bars (7).

15. Device (100) for continuous production of three dimensional fabrics (50) according to claim 9, which comprises pump means for moving a fluid (60) through a plurality of connected pipes (61) arranged inside said plurality of bars (7), said plurality of bars (7) comprising a plurality of nozzles (63) at a portion of said bars (7) said plurality of nozzles (63), being arranged downstream of said one or more rows of second sewing units (20) for sewing using connection strands (53), said plurality of nozzles (63) being utilized for impregnating said three dimensional fabric (50) with a thermosetting resin.

16. Device (100) for continuous production of three dimensional fabrics (50) according to claim 15, which comprises a pair of leveling elements (64) arranged perpendicularly with respect to the direction of advancement of said layers of fabric (51,52).

17. Device (100) for continuous production of three dimensional fabrics (50) according to claim 16, which comprises a device (65) for hardening resin, said device (65) for hardening resin being arranged downstream of said pair of levelling elements (64), said comb-like structure (6) being partially extended into said hardening device (65).

* * * * *